United States Patent
Goodman et al.

(10) Patent No.: US 8,814,498 B2
(45) Date of Patent: Aug. 26, 2014

(54) SELF-ACTUATING BLEED VALVE FOR A GAS TURBINE ENGINE

(75) Inventors: Robert Goodman, West Hartford, CT (US); Michael M. Kuhns, Suffield, CT (US); James S. Elder, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 717 days.

(21) Appl. No.: 12/949,127

(22) Filed: Nov. 18, 2010

(65) Prior Publication Data

US 2012/0128470 A1 May 24, 2012

(51) Int. Cl.
*F01B 25/02* (2006.01)

(52) U.S. Cl.
USPC .............. 415/28; 415/118; 415/144; 415/201

(58) Field of Classification Search
USPC ........... 415/25, 26, 27, 28, 36, 37, 38, 39, 40, 415/43, 45, 118, 125, 144, 146, 201; 137/498, 509, 517
See application file for complete search history.

(56) References Cited

U.S. PATENT DOCUMENTS

| | | | |
|---|---|---|---|
| 2,509,880 A * | 5/1950 | Pelton | 137/204 |
| 3,360,189 A | 12/1967 | Cook | |
| 3,511,576 A | 5/1970 | Herbstritt et al. | |
| 4,280,678 A | 7/1981 | Roberts | |
| 4,574,585 A | 3/1986 | Conn | |
| 5,477,673 A | 12/1995 | Blais et al. | |
| 6,122,905 A | 9/2000 | Liu | |
| 6,446,657 B1 | 9/2002 | Dziorny et al. | |
| 6,701,716 B2 | 3/2004 | Rayer et al. | |
| 6,883,331 B2 | 4/2005 | Jonsson et al. | |
| 7,555,905 B2 | 7/2009 | Borcea | |
| 2004/0103666 A1 * | 6/2004 | Jonsson et al. | 60/772 |
| 2005/0019156 A1 | 1/2005 | D'Angelo et al. | |
| 2006/0065477 A1 * | 3/2006 | Zhang | 181/237 |
| 2007/0044848 A1 * | 3/2007 | Norman | 137/542 |
| 2007/0089429 A1 * | 4/2007 | Makuszewski | 60/785 |
| 2009/0208321 A1 * | 8/2009 | O'Leary | 415/14 |

FOREIGN PATENT DOCUMENTS

DE 202004001877 5/2004

OTHER PUBLICATIONS

Chinese Search Report for CN201110415008.0 mailed Apr. 24, 2014.

* cited by examiner

*Primary Examiner* — Edward Look
*Assistant Examiner* — Juan G Flores
(74) *Attorney, Agent, or Firm* — Carlson, Gaskey & Olds, P.C.

(57) ABSTRACT

A bleed valve for an air plenum includes a valve body which defines a valve seat. A poppet is movable relative to the valve seat between an open position and a closed position. A spring biases the poppet to the open position and toward the air plenum.

16 Claims, 9 Drawing Sheets

SELF-ACTUATING BLEED VALVE FOR A GAS TURBINE ENGINE

BACKGROUND

This application relates to a self-actuated bleed valve to assist start-up of a gas turbine engine.

Gas turbine engines are provided with a number of functional sections, including a fan section, a compressor section, a combustion section, and a turbine section. At start-up, the turbine section of the gas turbine engine has not begun to fully provide power. Thus, driving the compressor, as an example, is more challenging than at steady state conditions and a bleed valve is typically utilized to bleed air away from the compressor section during start-up to reduce the load on the compressor section.

SUMMARY

A bleed valve for an air plenum according to an exemplary aspect of the present disclosure includes a valve body which defines a valve seat. A poppet is movable relative to the valve seat between an open position and a closed position. A spring biases the poppet to the open position and toward the air plenum.

A gas turbine engine according to an exemplary aspect of the present disclosure includes an air plenum in communication with a compressor section. A bleed valve includes a valve body which defines a valve seat, a poppet movable relative to the valve seat and a spring operable to bias the poppet away from the valve seat and toward the air plenum when the bleed valve is in an open position.

A method of installing a bleed valve on a gas turbine engine according to an exemplary aspect of the present disclosure includes locating a bleed valve in communication with an air plenum. Moving a poppet within a bleed valve between an open position and a closed position dependent on a pressure within a compressor section and biasing the poppet away from a valve seat and toward the air plenum when the bleed valve is in the open position.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
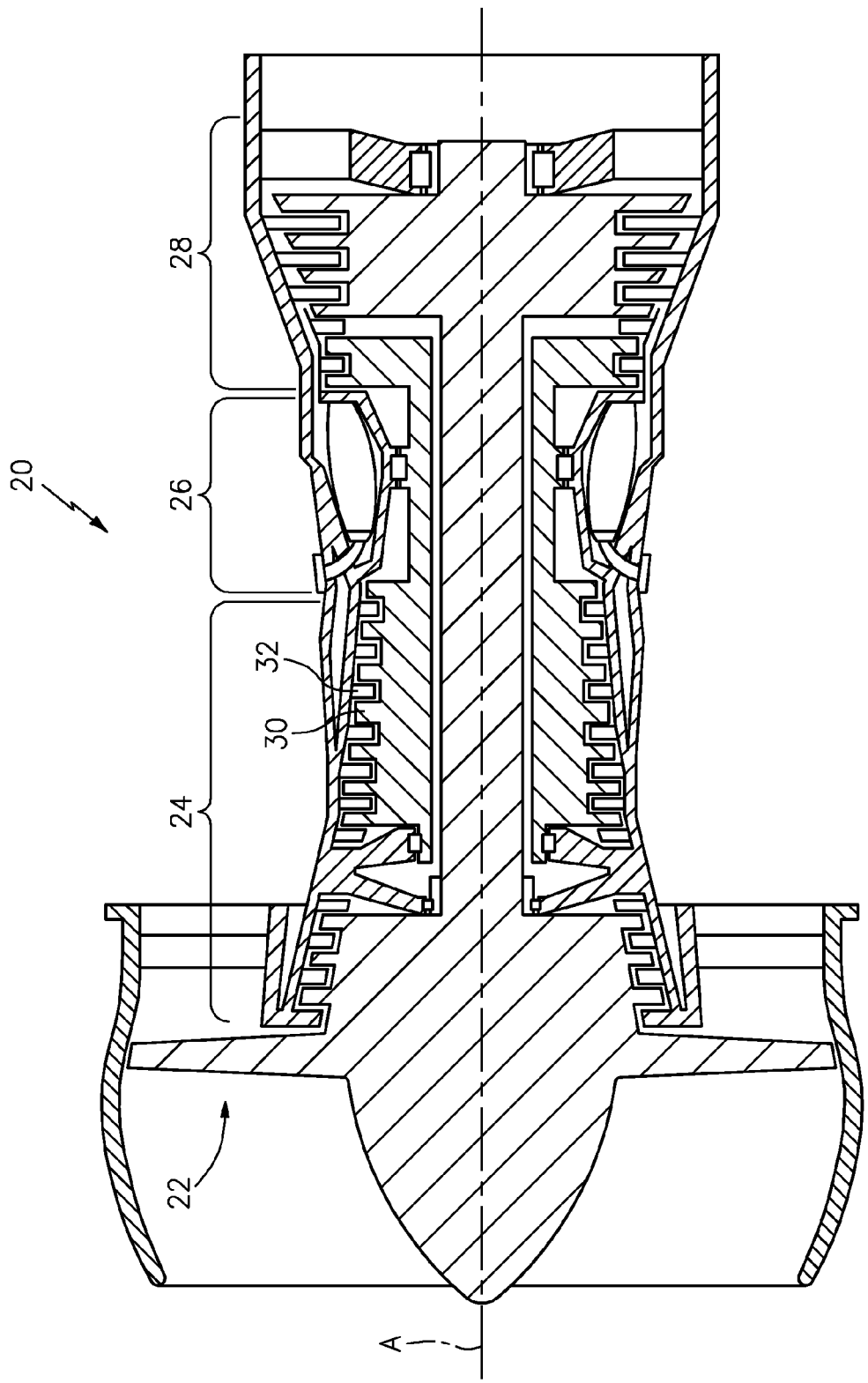
FIG. 1 is a schematic view of a gas turbine engine.

FIG. 1 schematically illustrates a gas turbine engine 20 that generally includes a fan section 22, a compressor section 24, a combustion section 26, and a turbine section 28 along axis A. FIG. 1 is a highly schematic view, however, it does show the main sections of the gas turbine engine. Further, while a particular type of gas turbine engine is illustrated, it should be understood that other types of gas turbine engines will also benefit herefrom.

Figure 2:
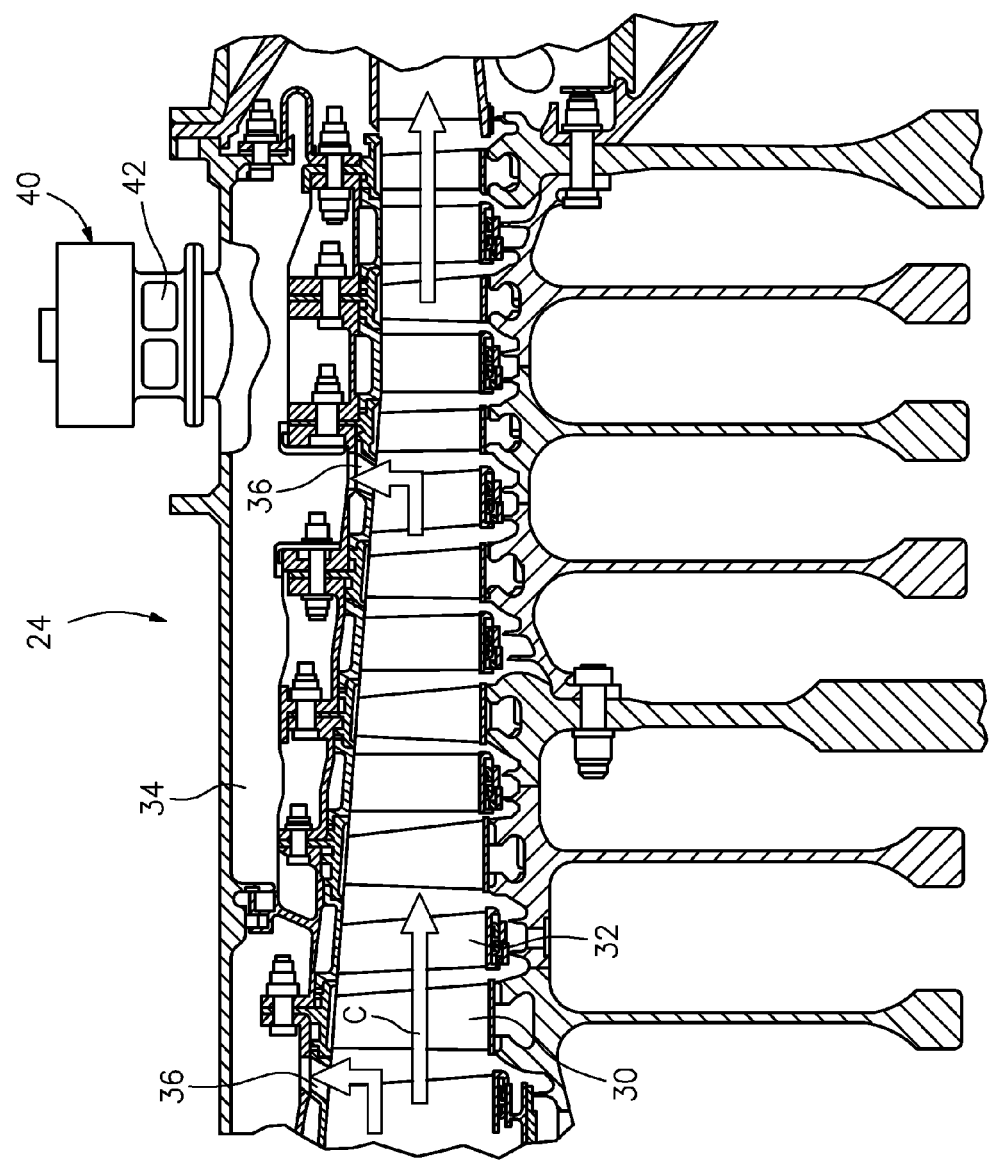
FIG. 2 is a partial cross-sectional view of a portion of a compressor section in the gas turbine engine.

With reference to FIG. 2, the compressor section 24 includes a plurality of rotating compressor blades 30 and fixed vanes 32 along a compressor gas path C. An airflow, known as a core airflow, is communicated along the compressor gas path C into the downstream turbine section 28 (FIG. 1). An air plenum 34 is typically positioned outwardly of the compressor gas path C such that compressed air flows through openings 36 from the compressor gas path C and into the air plenum 34 for use in, for example, a bleed flow system.

Figure 3:
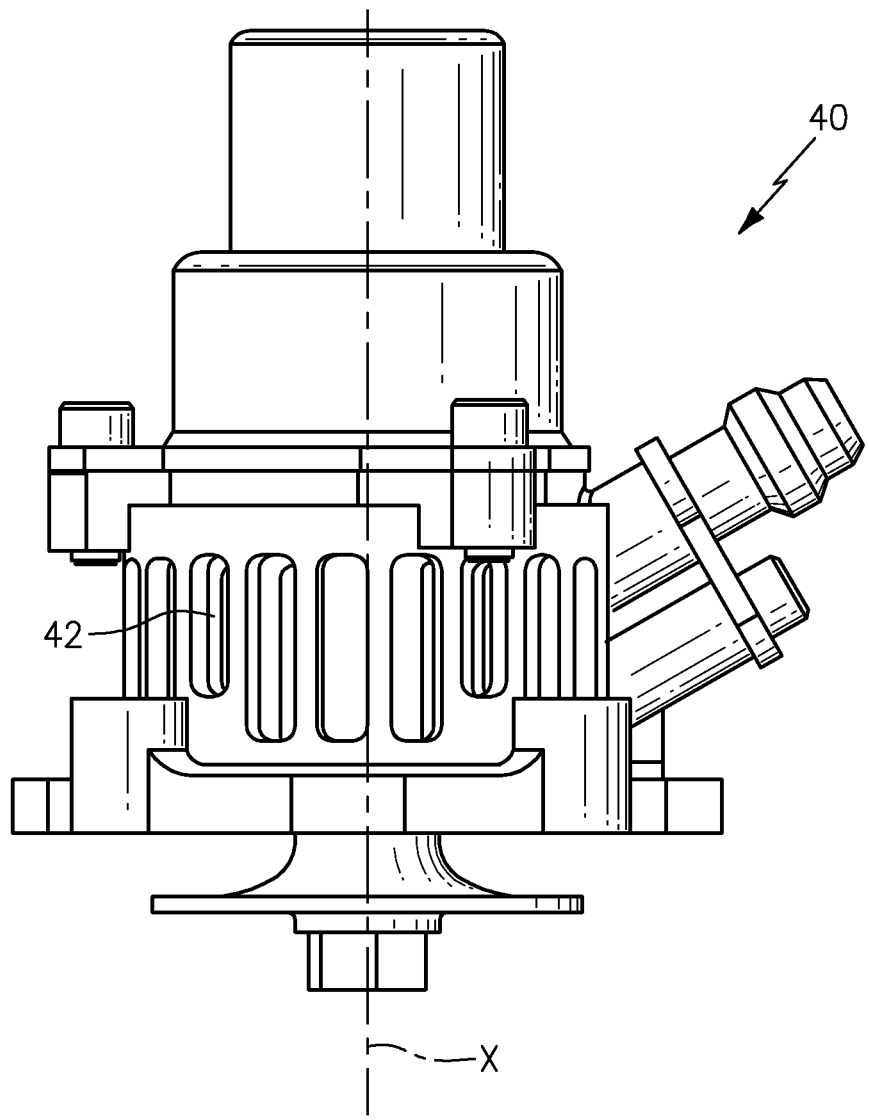
FIG. 3 is a perspective view of an bleed valve in an open position.

A bleed valve 40 includes a valve body 42 with openings (also shown in FIG. 3) that selectively dump air from the air plenum 34. The bleed valve 40 is in an open position at start-up conditions to vent bleed air into, for example, the nacelle (not shown), and thereby reduce the load on the compressor section 24. Thus, at start-up and lower pressure conditions, the bleed valve 40 reduces the load required to drive the compressor section 24, then closes once the compressor section 24 has reached operational pressures so the gas turbine engine will operate as designed.

Figure 4:
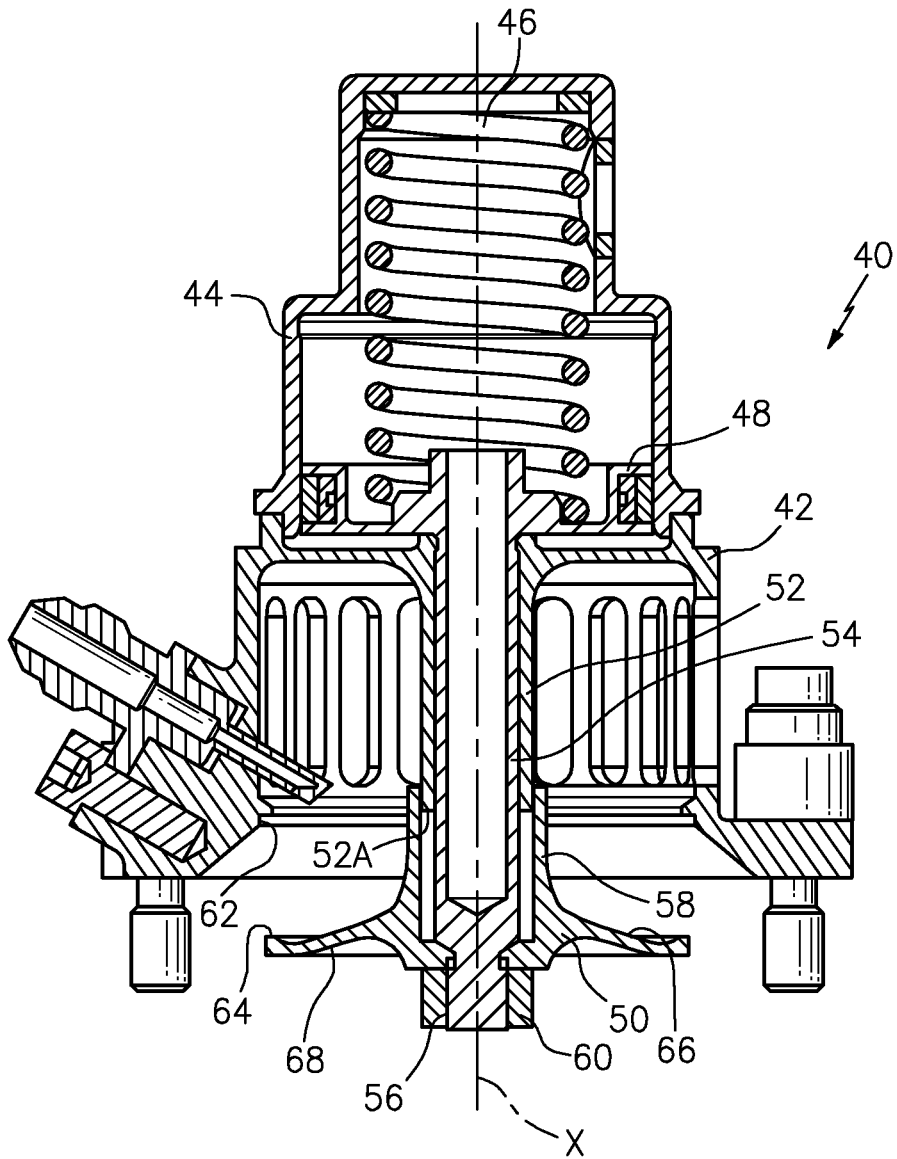
FIG. 4 is a cross-sectional view through the bleed valve in an open position.

With reference to FIG. 4, the bleed valve 40 generally includes a valve body 42, a cover 44, a spring 46, a piston 48 and a poppet 50. The valve body 42 forms a guide 52 within which a poppet shaft 54 extends. The poppet shaft 54 mounts the poppet 50 to the piston 48 such that the poppet 50 moves with the piston 48 along an axis X as defined by the guide 52. The poppet 50 moves between an open position (FIG. 5) which permits passage of the required bleed flow and a closed position which blocks flow (FIG. 6).

The poppet 50 is mounted to the poppet shaft 54 at an axial end section 56 such that an extended portion 58 of the poppet 50 may at least partially surround the guide 52. The axial end section 56 may be threaded to receive a fastener 60 to retain the poppet 50. The extended portion 58 facilitates alignment and axial movement of the poppet 50 relative to the valve body 42 which defines a valve seat 62. The extended portion 58 also shields an open end 52A of the guide 52 from any potential contamination in the compressor air from flowing through the clearance between the poppet shaft 54 and the guide 52 and potentially blocking movement of the bleed valve 40.

Figure 6:
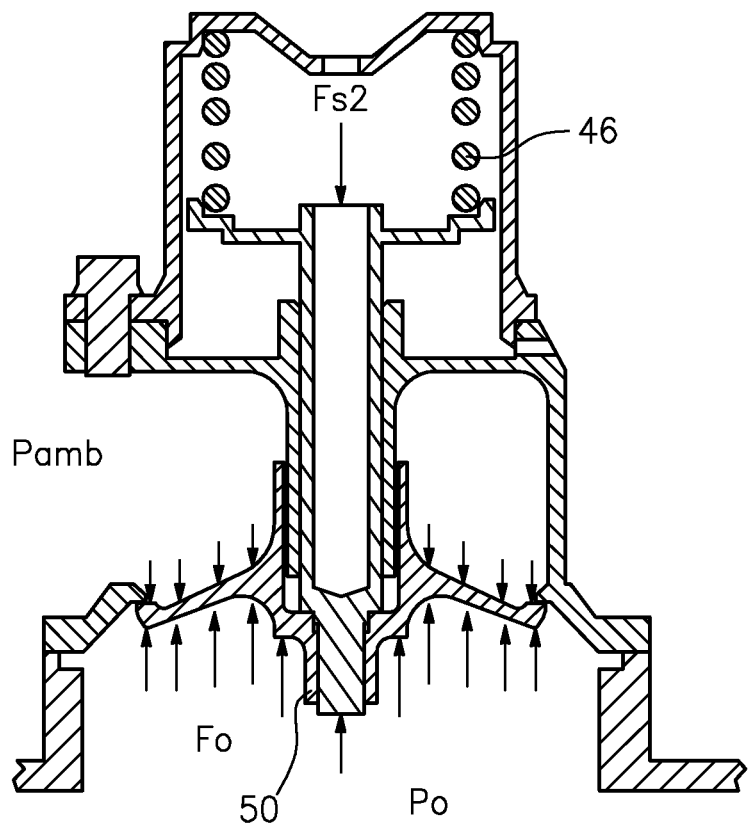
FIG. 6 is a schematic cross-sectional view through the bleed valve in a closed position.

The poppet 50 defines a downstream valve surface 64 (also shown in FIG. 3) which seats against the valve seat 62 when in a closed position (FIG. 6). The poppet 50 defines a downstream generally convex surface 66 which blends the extended portion 58 into the valve surface 64. An upstream generally concave surface 68 opposite the convex surface 66 faces upstream into the bleed flow from the air plenum 34 of the compressor section 24.

Figure 5:
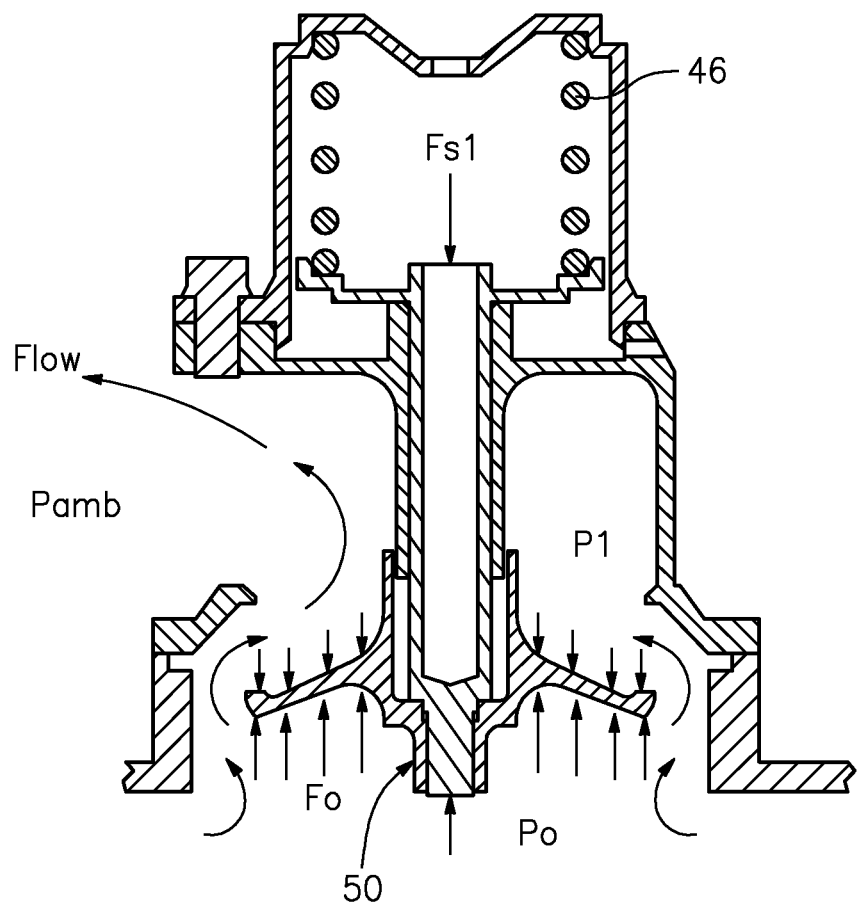
FIG. 5 is a schematic cross-sectional view through the bleed valve in an open position.

The spring 46 loads the piston 48 and thereby the poppet 50 to the open position (FIG. 5). As the engine spools up, during start, the stage pressure (Po) on the poppet 50 exerts a closing force (Fo). On the downstream side of the poppet 50 there is a backpressure distribution (P1) that exerts an opening force.

Figure 8:
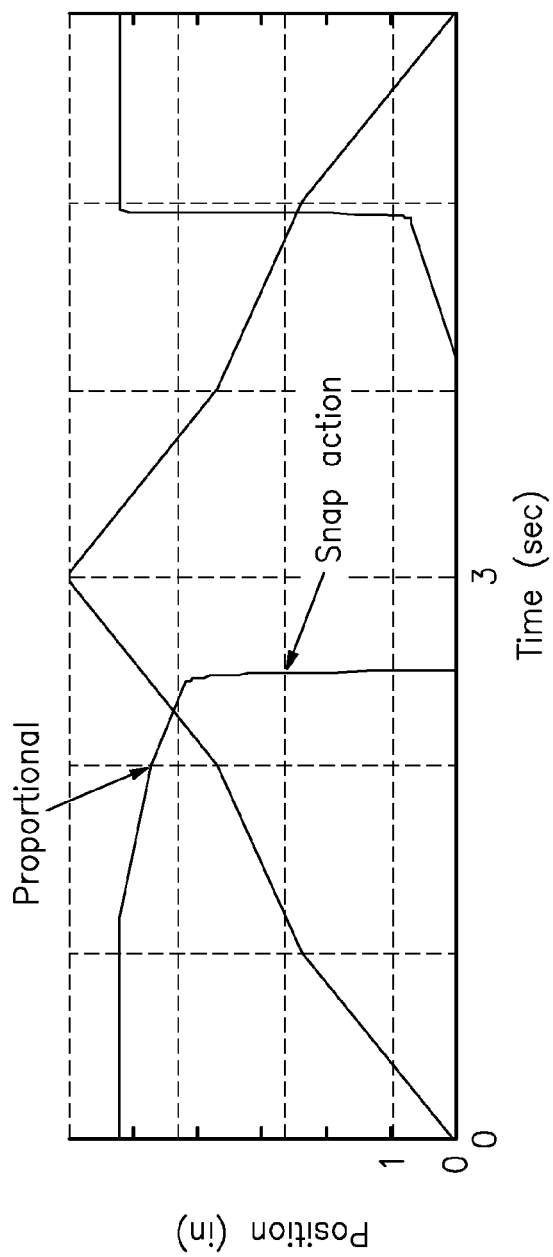
FIG. 8 is a graphical representation of a poppet position and deltaP vs. time illustrating the snap action.
Figure 9:
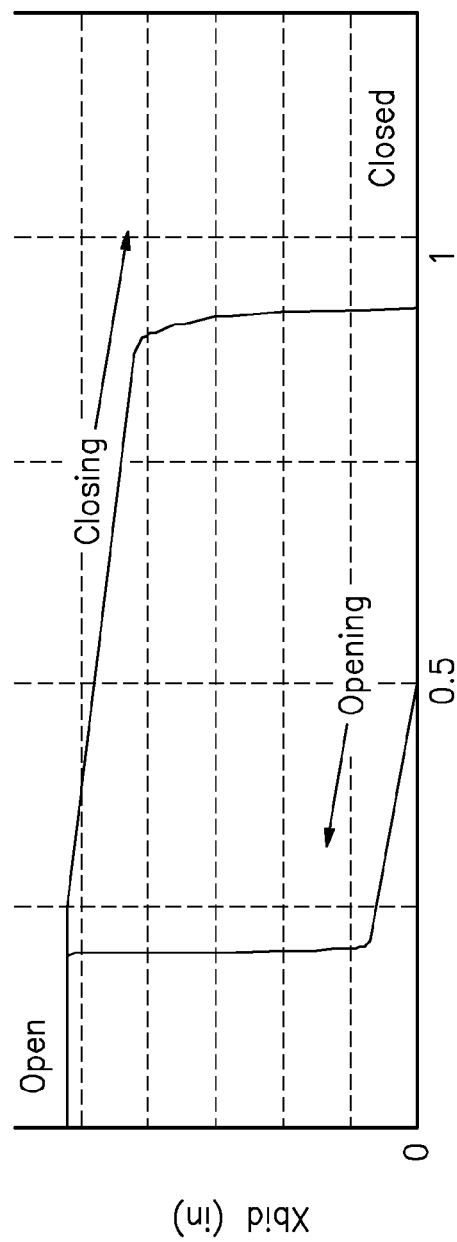
FIG. 9 is a graphical representation of a poppet position vs. pressure illustrating the offset open and close transient.

The spring force Fs1 will overcome the net closing force until the pressure force difference starts to exceed a predetermined value. The poppet 50 will then start to move toward the closed position (FIG. 6). As the poppet 50 moves toward the closed position, the pressure force on the downstream generally convex surface 66 is reduced since the flow is throttled, and the net closing force increases. This action results in the valve "snapping" closed to the position shown in FIG. 6 (see FIGS. 7, 8, and 9).

Figure 7:
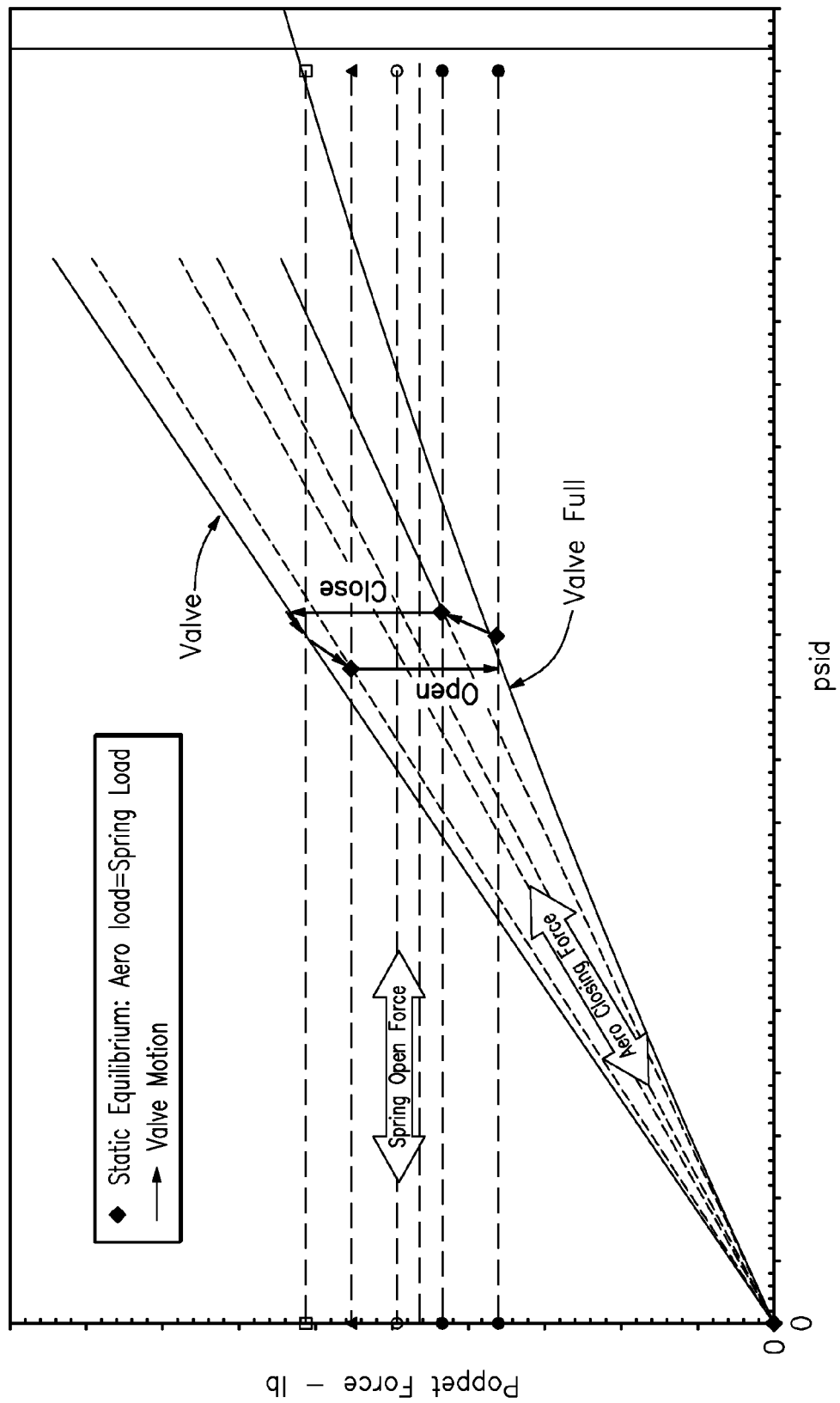
FIG. 7 is a graphical representation of a poppet force vs. PSID across the poppet.

With reference to FIG. 7, the nature of the snap action effect is illustrated as the valve closing force versus valve position for various valve lifts. Superimposed on this plot is the spring force as a function of poppet lift. By plotting the poppet lift path where the spring force intersects the pressure force it can be seen that shortly after initial closing motion occurs the pressure forces overcome the spring forces to generate the snap action effect (also illustrated in FIGS. 8 and 9). If the spring rate is increased, then there will be more of a proportional closing as the engine spools up. The snap action effect is desirable to ensure the bleed valve 40 closes with a minimal variation in inlet pressure from, for example, a sub-idle to idle condition as well as assures the bleed valve 40 does not inadvertently open. That is, the bleed valve 40 opens at a lower pressure than the pressure at which the bleed valve 40 closes. The bleed valve 40 thereby "fails closed" above a minimal pressure to avoid overheating the nacelle (not shown).

Figure 10:
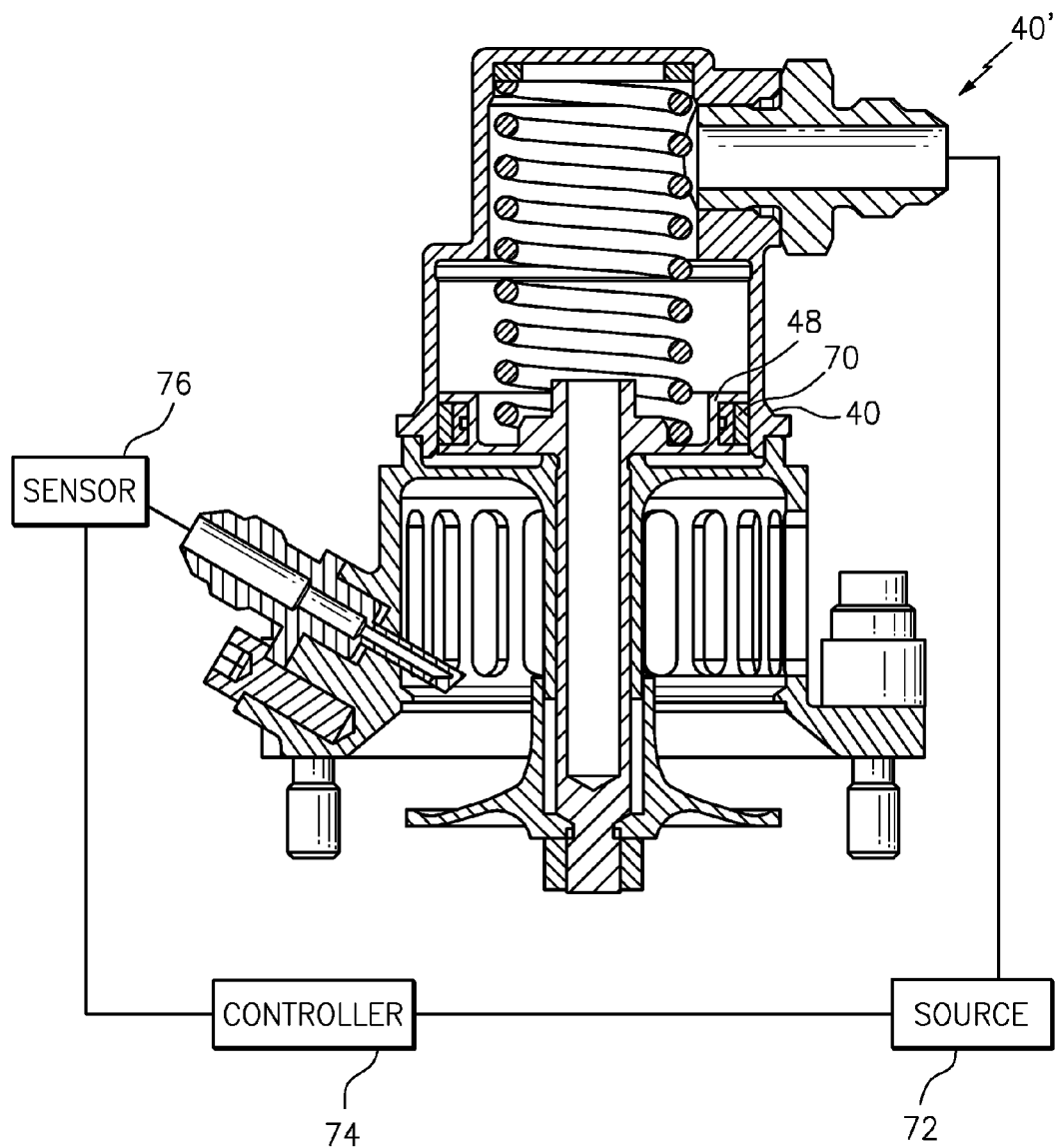
FIG. 10 is a schematic cross-sectional view through another non-limiting embodiment of an actively controlled bleed valve.

With reference to FIG. 10, another non-limiting embodiment of the bleed valve 40' provides for active operation. Although generally equivalent to the bleed valve 40 described above, bleed valve 40' locates a piston ring 70 between the piston 48 and the cover 44 to change a pressure within the cover 44 by an external source 72 such as a solenoid controller (illustrated schematically) to control movement of the piston 48 therein. The external source 72 selectively controls a pressure within the cover 44 in response to a controller 74 and a sensor system 76 to selectively control the bleed valve 40' when, for example, a possible surge condition is detected during start-up as well as other conditions such as taxi, take-off, climb, cruise and descent. The external source 72 may, for example, decrease the pressure within the chamber defined by the cover 44 to thereby overcome the spring force of the spring 46 and close the poppet 50.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A bleed valve for an air plenum comprising:
   a valve body which defines a valve seat, wherein said valve body defines a guide through which a poppet shaft which extends from a poppet is movable;
   a poppet movable relative to said valve seat between an open position and a closed position;
   a spring operable to bias said poppet to said open position and toward the air plenum;
   a spring operable to bias said poppet o said open position and toward the air plenum:
   a piston mounted to said poppet shaft, said piston supports a piston ring, wherein said piston ring interfaces with a cover; and
   an external pressure source in cozy communication with said cover to selectively change a pressure within said cover.

2. The bleed valve as recited in claim 1, wherein said valve body defines a concave valve seat which faces the air plenum.

3. The bleed valve as recited in claim 1, wherein said valve body defines a guide through which a poppet shaft which extends from said poppet is movable.

4. The bleed valve as recited in claim 3, wherein said poppet defines an extended portion which at least partially surrounds said guide.

5. The bleed valve as recited in claim 3, further comprising a piston mounted to said poppet shaft.

6. The bleed valve as recited in claim 1, wherein the valve has a first valve closing rate when transitioning from open to close and a closing force is under a predetermined threshold and wherein the valve has a second valve closing rate when transitioning from open to close and a closing force is over said predetermined threshold.

7. The bleed valve as recited in claim 6, wherein the first valve closing rate is less than the second valve closing rate.

8. The bleed valve as recited in claim 1, wherein the valve has a first valve opening rate when transitioning from close to open and an opening force is under a predetermined threshold and wherein the valve has a second valve opening rate when transitioning from close to open and an opening force is over said predetermined threshold.

9. The bleed valve as recited in claim 8, wherein the first valve opening rate is less than the second valve opening rate.

10. A gas turbine engine comprising:
    a compressor section;
    an air plenum in communication with said compressor section; and
    a bleed valve in communication with said air plenum, said bleed valve movable between an open position and a closed position dependent on a pressure within the compressor section, said bleed valve comprising:
      a valve body which defines a valve seat;
      a poppet movable relative to said valve seat; a spring operable to bias said poppet away from said valve seat and toward said air plenum when said bleed valve is in said open position: and
    a piston mounted to said poppet shaft, said piston interfaces with a cover to define a pressure chamber; and
    an external pressure source in communication with said cover to selectively reduce a pressure within said cover to overcome said spring and move said poppet to said closed position.

11. The gas turbine engine as recited in claim 10, wherein said air plenum surrounds said compressor section.

12. A method of installing a bleed valve on a gas turbine engine comprising:

locating a bleed valve in communication with an air plenum in communication with a compressor section, wherein the bleed valve includes:
  a valve body which defines a valve seat, wherein said valve body defines a guide through which a poppet shaft which extends from a poppet is moveble;
  a poppet movable relative to said valve seat between an open position and a closed position;
  a spring operable to bias said poppet o said open position and toward the air plenum;
  a spring operable to bias said poppet to said open position and toward the air plenum:
  a piston mounted to said poppet shaft, said piston supports a piston ring, wherein said piston ring interfaces with a cover; and
  an external pressure source in communication with said cover to selectively change a pressure within said cover;
moving a poppet within a bleed valve between an open position and a closed
biasing the poppet away from a valve seat and toward the air plenum when the position dependent on a pressure within the compressor section; and bleed valve is in the open position.

13. The method as recited in claim 12, further comprising:
dumping air compressed by the compressor section when the bleed valve is in the open position.

14. The method as recited in claim 12, further comprising:
blocking air compressed by the compressor section when the bleed valve is in the closed position.

15. The method as recited in claim 12, further comprising:
snapping the poppet to the closed position wherein as the poppet moves toward the closed position, the pressure force on a downstream side of the poppet is reduced to throttle the flow thereby increasing a net closing force.

16. The method as recited in claim 12, further comprising:
actively controlling the poppet.

\* \* \* \* \*

UNITED STATES PATENT AND TRADEMARK OFFICE
CERTIFICATE OF CORRECTION

PATENT NO. : 8,814,498 B2  Page 1 of 1
APPLICATION NO. : 12/949127
DATED : August 26, 2014
INVENTOR(S) : Robert Goodman et al.

It is certified that error appears in the above-identified patent and that said Letters Patent is hereby corrected as shown below:

IN THE CLAIMS:

In claim 1, column 4, line 6; delete "a" and replace with --the--

In claim 1, column 4, line 10; delete "o" and replace with --to--

In claim 1, column 4, line 15; delete "cozy"

Delete Claim 3, column 4, lines 21-23

In claim 4, column 4, line 24; delete "3" and replace with --1--

In claim 5, column 4, line 27; delete "3" and replace with --1--

In claim 10, column 4, line 58; delete "said" and replace with --a--

In claim 12, column 5, line 9; delete "o" and replace with --to--

In claim 12, column 5, line 20; after "closed" insert --position dependent on a pressure within the compressor section; and--

In claim 12, column 6, line 2; after "the" delete "postition dependent on a pressure within the compressor section; and"

Signed and Sealed this
Fourteenth Day of April, 2015

Michelle K. Lee
*Director of the United States Patent and Trademark Office*